May 15, 1962     L. F. WELANETZ ET AL     3,034,351

SIMULATOR

Filed Aug. 27, 1954     7 Sheets-Sheet 2

ROBERT B. JOHNSTON
HAROLD S. MORTON
LUDOLPH F. WELANETZ
INVENTORS

BY
ATTORNEYS

May 15, 1962 L. F. WELANETZ ET AL 3,034,351
SIMULATOR
Filed Aug. 27, 1954 7 Sheets-Sheet 4

ROBERT B. JOHNSTON
HAROLD S. MORTON
LUDOLPH F. WELANETZ
INVENTORS

FIG. 13.

BY
ATTORNEYS

May 15, 1962 L. F. WELANETZ ETAL 3,034,351
SIMULATOR
Filed Aug. 27, 1954 7 Sheets-Sheet 5

FIG. 5.

ROBERT B. JOHNSTON
HAROLD S. MORTON
LUDOLPH F. WELANETZ
INVENTORS

BY
ATTORNEYS

May 15, 1962  L. F. WELANETZ ETAL  3,034,351
SIMULATOR

Filed Aug. 27, 1954  7 Sheets-Sheet 6

ROBERT B. JOHNSTON
HAROLD S. MORTON
LUDOLPH F. WELANETZ
INVENTORS

BY
ATTORNEYS

May 15, 1962   L. F. WELANETZ ETAL   3,034,351
SIMULATOR

Filed Aug. 27, 1954   7 Sheets-Sheet 7

ROBERT B. JOHNSTON
HAROLD S. MORTON
LUDOLPH F. WELANETZ
INVENTORS

BY
ATTORNEYS

United States Patent Office 3,034,351
Patented May 15, 1962

3,034,351
SIMULATOR
Ludolph F. Welanetz, Hempstead, N.Y., Robert B. Johnston, Austin, Tex., and Harold S. Morton, Takoma Park, Md., assignors to the United States of America as represented by the Secretary of the Navy
Filed Aug. 27, 1954, Ser. No. 452,744
13 Claims. (Cl. 73—167)

This invention relates to a simulator and more particularly to a simulator for use in lethality studies of projectiles such as, for example, guided missiles provided with proximity fuzes.

In studying proximity fuzed anti-aircraft missiles for the purpose of improving their lethality there are a great many factors which must be considered. Among these factors are the shape of the fuze radiation pattern, the shape and size of the aircraft reflecting surface, the warhead burst pattern, and the shape, size, and position of vulnerable components on the aircraft. All of these enter into the solution of two of the major problems encountered in lethality studies. The first of these problems is to find the fuze triggering and burst positions; that is, given a fuze with specified characteristics, find the relative positions of the missile and the target aircraft at the instant the fuze triggers and the instant the explosive in the missile detonates. The second problem is: given the above burst position, find the number of fragment hits on each vulnerable component of the target aircraft. The solution of these problems does not comprise the entire lethality study; however, after these have been solved, the remaining calculations are relatively simple.

The solution of problems of this type by carrying out the mathematical calculations involved would require a number of man hours of work that would probably prohibit the undertaking. The present invention provides a simulator in the form of a simple analog device to simplify and reduce the calculations.

Accordingly, it is an object of this invention to provide apparatus and method by means of which the lethality of influence-exploded fuzes and warheads can be studied and their performance improved upon.

A still further object of this invention is to provide a simulator for investigating the lethality of warheads of different types, thereby avoiding the detailed mathematical computations that such an investigation formely required.

A more specific object of this invention is to provide means for determining the relative positions of a missile carrying an influence-exploded warhead and a target aircraft at the instant the warhead is detonated.

Another specific object of this invention is to provide means for determining the number and approximate location of fragment hits made on a given target aircraft, after the relative positions of warhead and target at detonation have been determined. The data thus taken make it possible to determine approximately the points along the missile's trajectory at which the warhead should be detonated in order to hit the vulnerable components of a target aircraft.

Other objects and many of the attendant advantages of this invention will be readily appreciated as the same becomes better understood by reference to the following detailed description when considered in connection with the accompanying drawings, wherein.

Briefly, the invention comprises a device by means of which the attack of a missile upon a target aircraft can be simulated to a high degree of accuracy. Means are provided for representing the relative missile and target positions as determined by one of the many possible trajectories of the fuzed missile. Means describing a cone is positioned at the point determined by the co-ordinates of the missile position to simulate the radiation pattern of the fuze. The target aircraft is represented by a model which is mounted so that it may be oriented to account for the angles of approach which determine the aspect of attack. Means provided simulates the motion of the target relative to the missile so that the point at which the target touches the fuze cone representing the radiation pattern of the fuze, thus detonating the warhead, can be determined. A source of light positioned at the point so determined simulates the missile warhead. To simulate the fragmentation pattern, circles are drawn on a transparent member which is arranged in conjunction with the light source and the target aircraft to project the representation of said pattern and said aircraft onto a screen so that the number of fragment hits may be determined.

Figures 1, 9:
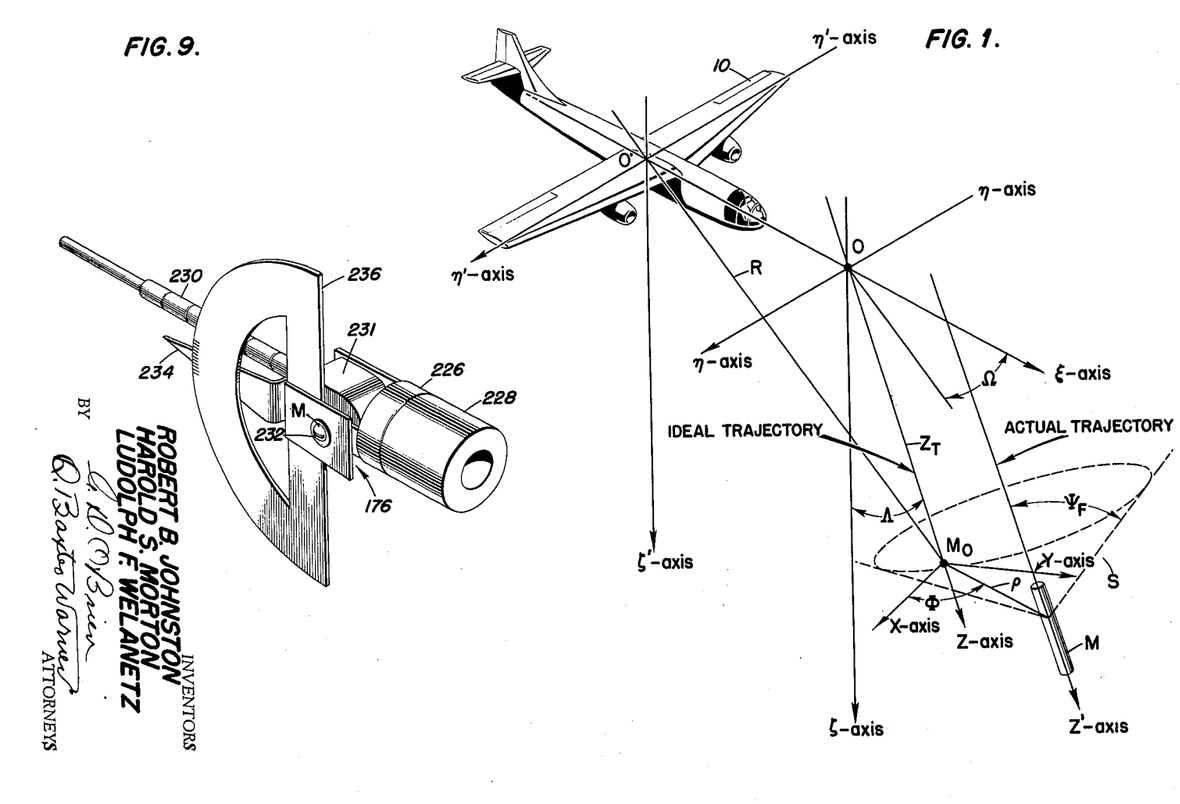
FIG. 1 is a diagrammatic static representation of the problem of determining triggering distance.
FIG. 9 is a perspective view of the device used to simulate the fuze cone angle.
Figures 2, 2A:
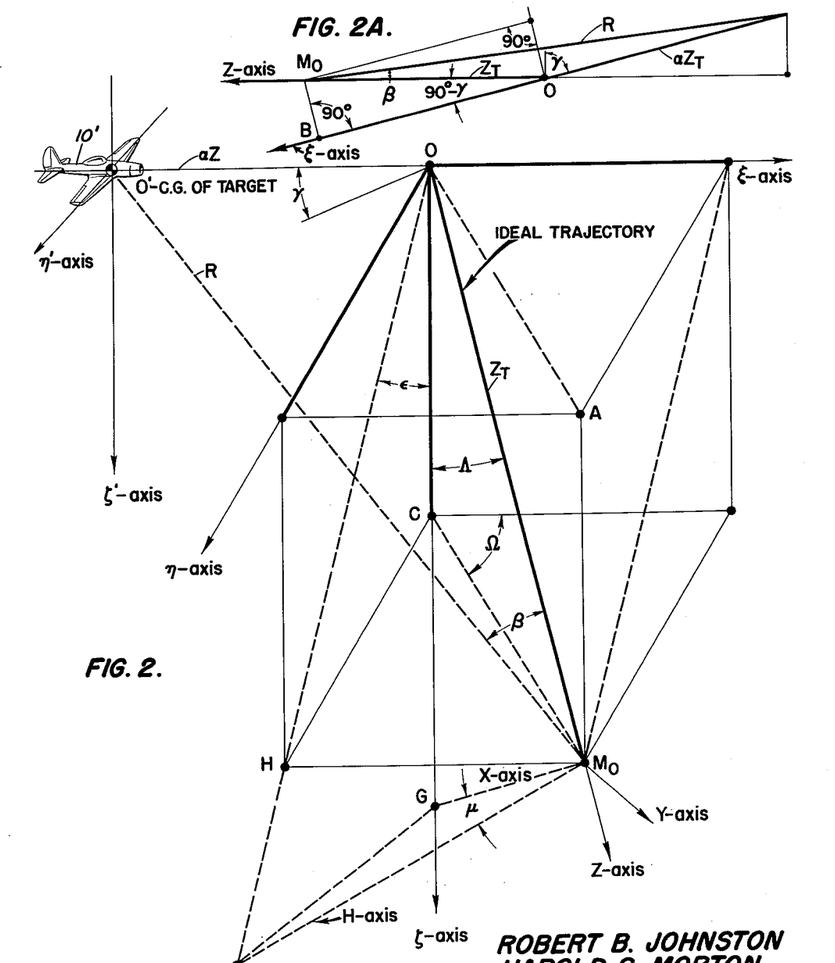
FIG. 2 is a detailed representation of the problem showing the relationships necessary for understanding the construction and operation of the simulator of the present invention.
FIG. 2A is a detail of one aspect of the geometry, showing some of the quantities of FIG. 2 in their true projection.

The geometry of the situation involved in the solution of the problem of determining fuze triggering distance is represented somewhat pictorially in FIG. 1 and in more detail in FIGS. 2 and 2A. A target aircraft 10 is shown in normal level flight along the line of flight $\xi$ which is also the roll axis of the airplane. The center of gravity of the aircraft is indicated at O' and its pitch and yaw axes are $\eta'$ and $\zeta'$, respectively. A missile is shown at M, FIG. 1, moving along an actual trajectory Z'. The Z-axis represents the ideal trajectory of the missile and is defined as an axis parallel to the trajectory Z' such that if the missile were at $M_O$, that is, the projection of M on the Z-axis, the missile would collide with the target at point O. The pitch and yaw axes associated with point O are labeled $\eta$ and $\zeta$, respectively. The aspect of attack of the missile M on the target plane 10 is specified by two angles $\Omega$ and $\Lambda$. $\Omega$ is the dihedral angle between the Z—$\zeta$ plane and the $\zeta$—$\xi$ plane and is regarded as the azimuth of the missile, using point O as a reference point. $\Lambda$ is the angle between the Z-axis and the $\zeta$-axis and may be considered the elevation of the missile.

The ideal missile trajectory Z is used as a reference axis. The actual position of the missile M relative to the ideal trajectory is specified by a miss distance $\rho$ and a miss orientation angle $\phi$ located in a plane defined by the axes X and Y as shown in FIG. 1. The X-axis is normal to the Z-axis at $M_O$ and lies in the Z—$\zeta$ plane. It is also the intersection of the Z—$\zeta$ and $\rho$—$\phi$ planes and is directed toward the $\zeta$ axis when $\Omega$ is less than 90°. The Y-axis is normal to both the Z-axis and the X-axis at $M_O$ and is directed toward the $\zeta$—$\xi$ plane when $\Omega$ is less than 90°. As will be discussed hereinafter, the position of the X-axis varies for different aspects of attack. A cone having a half-apex angle $\Psi_F$ and a surface generated by the slant range S of the missile fuze represents the radiation pattern of the fuze.

It will be understood from consideration of FIG. 1 that if the aspect angles $\Lambda$ and $\Omega$, the missile velocity, the target velocity, the fuze characteristics $\Psi_F$ and S, and the quantities $\rho$ and $\phi$ are specified, the fuze triggering distance can be determined by moving the target the proper proportionate distance along the line of approach between the target and ideal missile until the fuze cone defined by the half-apex angle $\Psi_F$ and the slant range S touches the airplane 10. The magnitude of the line $OM_O$ is the fuze triggering distance, designated $Z_T$, which it is desired to find. The corresponding distance $O'M_O$ is designated R. As will be seen hereinafter, the relationship between these distances is a basic consideration in the construction of the apparatus.

The vectorial representation of FIG. 2 further illustrates the relationship between various quantities involved in the construction of the simulator for determination of the fuze triggering distance $Z_T$. Referring particularly to FIG. 2, the $\eta$, $\zeta$ and $\xi$ axes, associated with the target position O, and the Z-axis, representing the ideal trajectory of the missile, are shown in heavy lines. Point A is the projection of point $M_O$ onto the $\eta$—$\xi$ plane. It can be understood from inspection how the coordinate system shown is constructed using these points and lines.

The H-axis, shown in dotted lines, is the line of intersection of the Z—$\xi$ plane and X—Y plane, in which $\rho$ and $\phi$ lie. $\mu$ is the measure of the dihedral angle between the Z—$\zeta$ plane and the Z—$\xi$ plane. Thus, $\mu$ locates the X-axis, also shown in dotted lines, which appears in FIG. 1 as the reference axis for the angle $\phi$. As will be seen hereinafter, the H-axis was made horizontal in the simulator because the simulator is constructed with the Z—$\xi$ plane horizontal. In the simulator, $\mu$ is variable because different angles of approach are assumed thus changing the orientation of the Z—$\zeta$ and the Z—$\xi$ planes.

The angle $\gamma$ is the angle in the Z—$\xi$ plane between the $\xi$ axis and the X—Y plane, the X—Y plane being normal to the Z-axis. This angle is shown in its position relative to other quantities in FIG. 2, and in its true projection in FIG. 2A. Its usefulness is in deriving the relationships between other quantities and in orienting the target in the simulator. Using trigonometric functions it can be shown that:

$$\sin \gamma = \sin \Lambda \cos \Omega \qquad (1)$$

Thus, the angle $\gamma$ can be determined if the aspect angles $\Lambda$ and $\Omega$ are known.

The angle of approach $\beta$, FIGS. 2 and 2A, is the angle between the Z-axis and the line $O'M_O$, which is the line of approach between the ideal missile and target. Referring to FIG. 2A, it can be shown that:

$$\tan \beta = \frac{\alpha \cos \gamma}{1 + \alpha \sin \gamma} \qquad (2)$$

where:

$$\alpha = \frac{V_T}{V_M}$$

and $V_M$ and $V_T$ are the absolute velocities of the missile and the target, respectively.

Using the relationships (1) and (2) to determine $\gamma$ and $\beta$, respectively, for given values of $\Lambda$, $\Omega$, $V_T$ and $V_M$, and a value of R which is determined by the simulator in a manner to be described hereinafter, the fuze triggering distance $Z_T$ can be determined from the following equation, which can also be derived from FIG. 2A:

$$Z_T = R\left(\frac{\cos \beta}{1 + \alpha \sin \gamma}\right) \qquad (3)$$

In FIG. 2, $\epsilon$ is the measure, in the $\eta$—$\zeta$ plane, of the dihedral angle between the Z—$\zeta$ and the Z—$\xi$ planes. As will become clear hereinafter, the angle $\epsilon$ is useful in orienting the target correctly for a given aspect defined by $\Lambda$ and $\Omega$. It can be shown that:

$$\tan \epsilon = \sin \Omega \tan \Lambda \qquad (4)$$

Furthermore, it can be shown that the angle $\mu$, which is the angle between the H-axis and the X-axis, can be determined by the formula:

$$\tan \mu = \frac{\tan \Omega}{\cos \Lambda} \qquad (5)$$

Figures 3, 6:
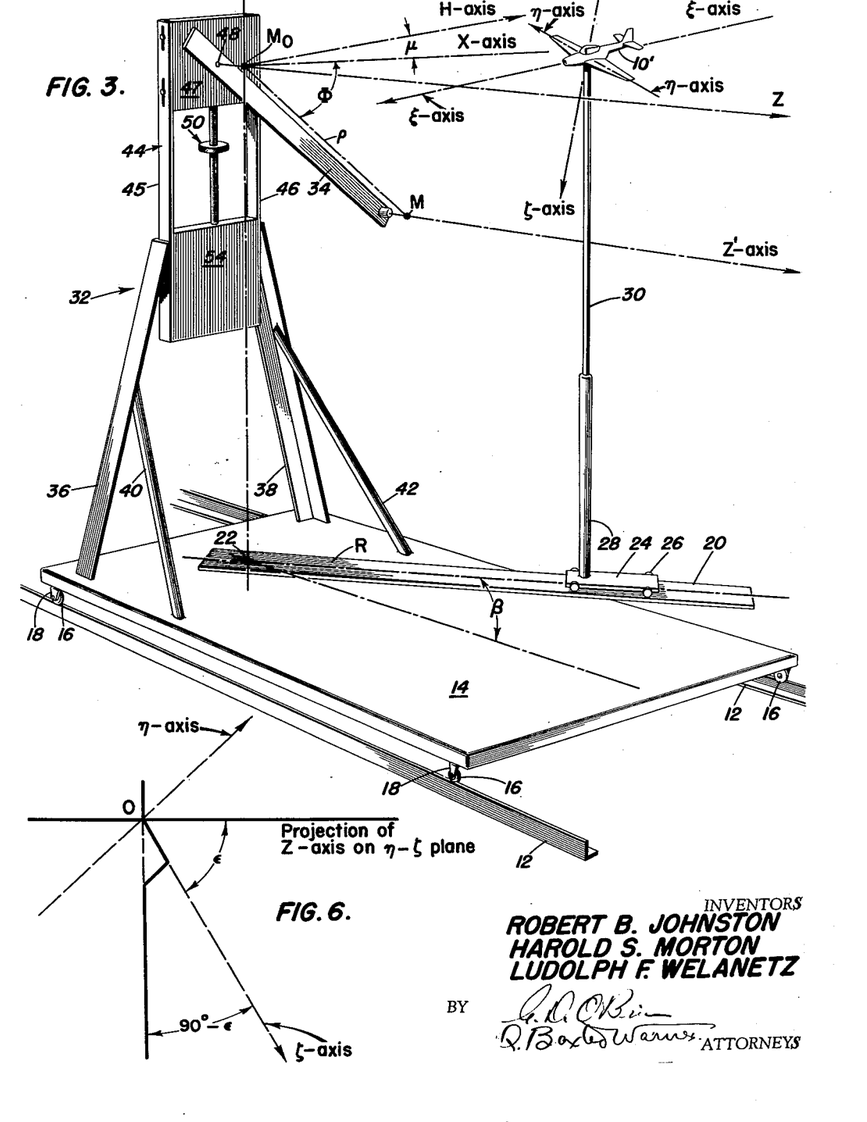
FIG. 3 is a schematic perspective of the simulator.
FIG. 6 illustrates the geometry of the bent rod which is used in orienting the target as shown in FIG. 4.

Returning to the description of the apparatus, FIG. 3 shows schematically the mechanical simulator which may be used to measure the distance R for different given values of $\Lambda$, $\Omega$, $\phi$, $\rho$, $V_T$, $V_M$, S and $\Psi_F$. For the sake of convenience in the construction and operation of the device, the reference planes have been rotated. Because of the manner in which the angle $\beta$, determining the relative line of approach of the missile M and the target 10', is set into the simulator, the plane Z—$\xi$ must always be perfectly horizontal. The axis H is horizontal and the plane defined by this axis and an axis V, perpendicular to the H-axis, must be vertical. This vertical plane contains the reference axis X and the quantities $\phi$ and $\rho$, as shown.

As can be seen in FIG. 3, the simulator comprises a pair of spaced L-shaped rails 12. A platform 14 is mounted for motion along the rails by wheels 16 which are in rolling contact with the upper edge of the rails, the wheels 16 being attached to the platform 14 by brackets 18. A movable track 20 is pivotally mounted on the platform 14 by a pin 22, and a target carriage 24, provided with wheels 26, is arranged to roll along the track 20. The track 20 pivots about the V-axis, in a plane parallel to the Z—$\xi$ plane. A pedestal 28 is located on the center line of the carriage adjacent its forward end. The pedestal receives a mounting post 30 on the upper end of which the target plane 10' is mounted.

At one end of the platform 14 there is provided a stand 32 which supports a rotatable arm 34. The stand 32 comprises a pair of spaced legs 36 and 38 reinforced by braces 40 and 42, respectively. A frame 44 is supported on the legs 36 and 38 and includes sides 45 and 46, and an adjustable panel 47 provided with a pivot pin 48 for mounting the rotatable arm 34. An adjusting screw 50 is threaded into panel 47 and bears at its lower end on a panel 54 extending between the frame sides 45 and 46.

The rotating arm 34 is the means by which the quantities $\rho$ and $\phi$ are varied. As will be described hereinafter, the arm 34 carries at point M the means by which the fuze cone and fragmentation pattern are simulated so that these can be located at various miss positions corresponding to different values of $\phi$ and $\rho$. The angle $\beta$, which is the angle of approach of the ideal missile and the target, can be set into the simulator by pivotally moving the track 20 with respect to the center line of the platform 14. The adjusting screw 50 permits the axis of rotation of the arm 34 to be kept in the same horizontal plane as the $\xi$ axis.

Figures 4, 10:
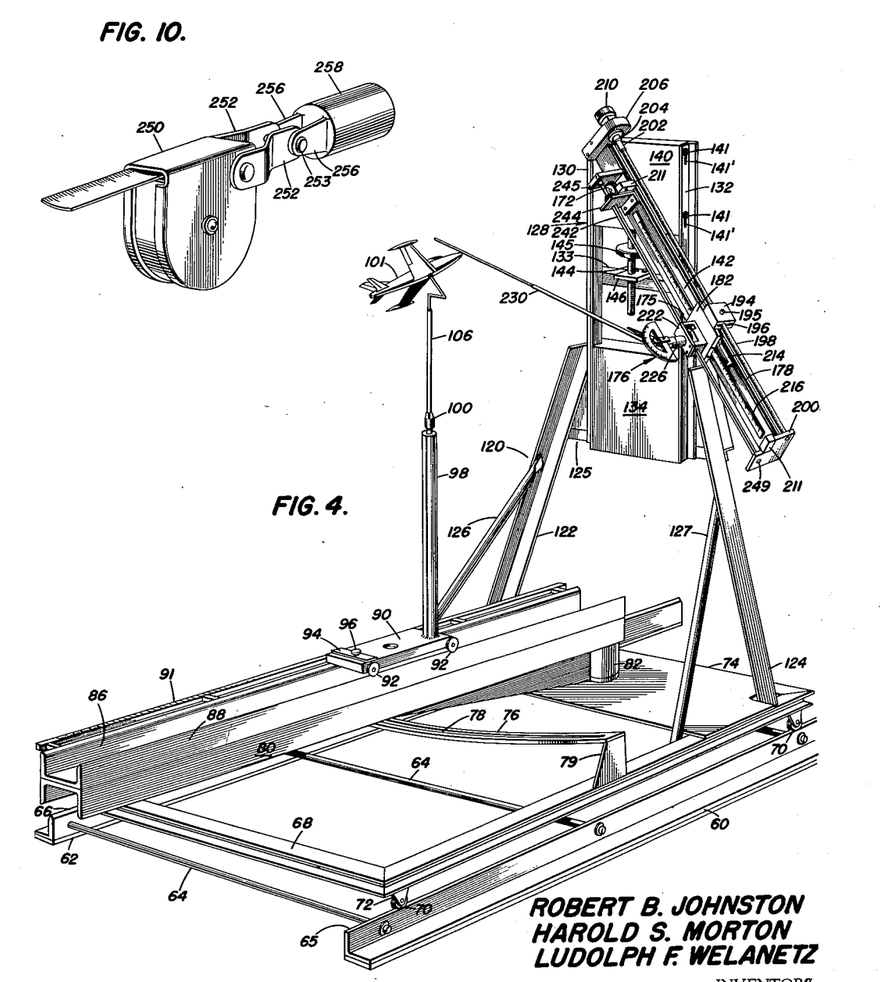
FIG. 4 is a detailed perspective of the simulator for use in solving the problem of determining fuze triggering distance.
FIG. 10 is a perspective of a feature of the simulator that is used to measure distance to the target.
Figure 13:
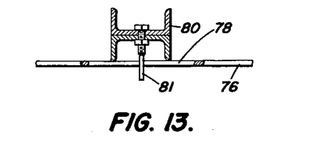
FIG. 13 is a fragmentary section showing a detail of the track in FIG. 4.

FIG. 4 shows the details of the simulator actually used to determine fuze triggering distance. As in the schematic of FIG. 3, the simulator is shown including a base having a pair of spaced parallel L-shaped rails 60 and 62 interconnected by a plurality of rods 64. One rail 60 has a flat upper edge 65 while the other rail 62 has an upper edge 66 in the form of an inverted V. A rectangular bed 68 is movably mounted on the rails 60 and 62 by means of a plurality of wheels 70 which are supported from the underside of said frame by brackets 72. The bed 68 supports a platform 74 at one end thereof, and a sector 76 having a slot 78 therein is mounted on said bed in vertically spaced relationship thereto by lugs 79. A track 80, generally I-shaped in cross section, is pivotally carried on the platform 74 by means of a pivot shaft 82. The pivotal movement of the track 80 is limited by a pin 81 (FIG. 13) carried on the track 80 and arranged to project into the slot 78 in sector 76.

The track 80 includes spaced rails 86 and 88 along which a target carriage 90 moves. A scale 91, calibrated in feet, is also provided extending along the track 80. The carriage 90 has wheels 92 and a brake 94 which can be moved by a thumb screw 96 to engage a pair of said wheels, thereby holding said carriage in any desired fixed position along the track 80. A tubular pedestal 98 extends vertically from the carriage 90 and carries a chuck or similar adjustable gripping device 100 at its upper end. The target 101 is supported at the upper end of a supporting rod 106 which has its other end received in chuck 100. The rod 106 is bent to provide for the aspect of the target, as will be explained hereinafter.

Figure 5:
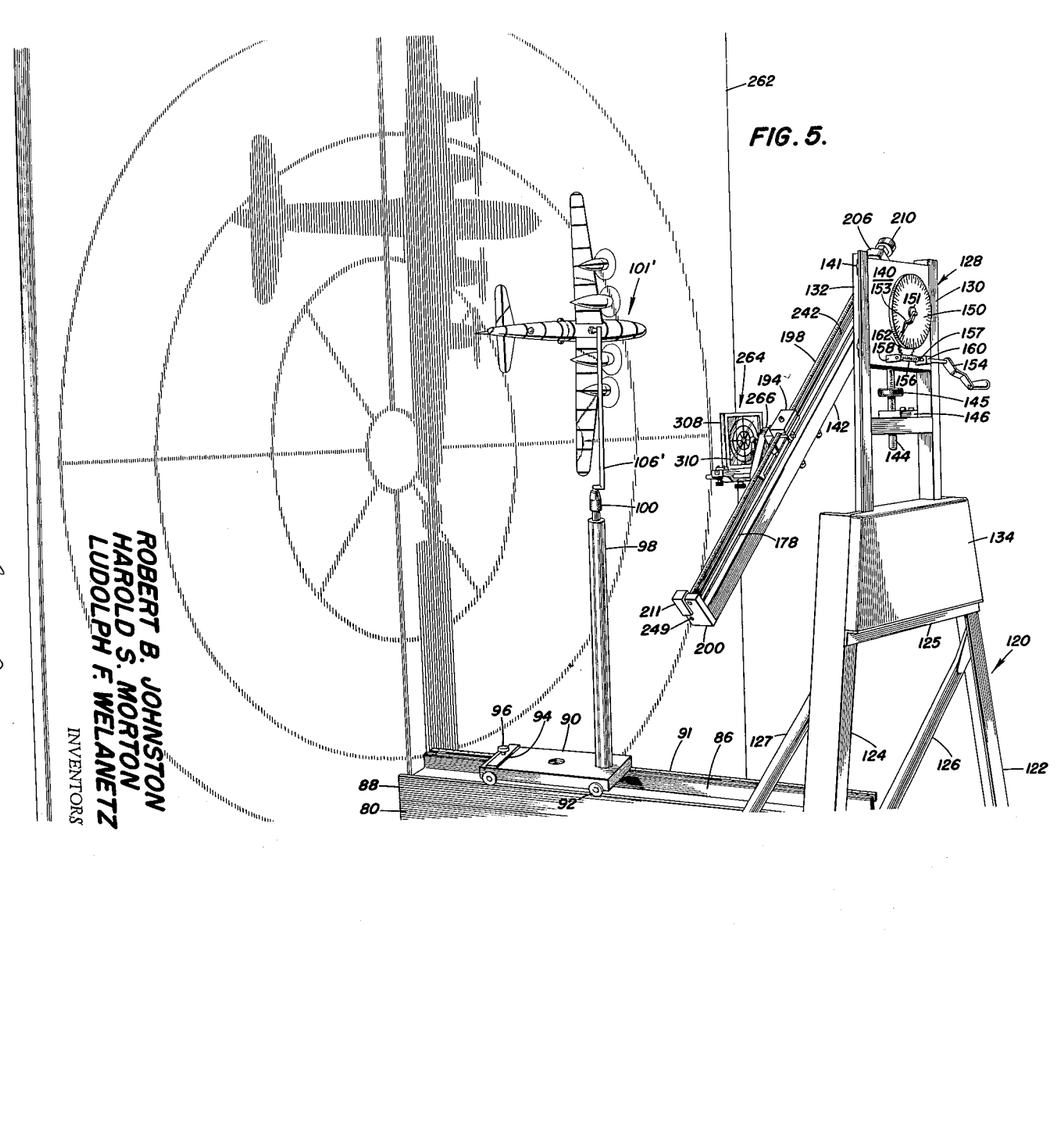
FIG. 5 is a detailed perspective view of the simulator set up for solving the problem of determining fragment hits.

A vertically extending stand for supporting a rotating arm 142 and similar to the stand 32, is indicated generally at 120. As in the schematic diagram, the stand 120 comprises legs 122 and 124. The legs are interconnected by a cross member 125, and braces 126 and 127 are provided for legs 122 and 124, respectively. A frame 128 having sides 130 and 132 is supported by said legs, and a cross member 133 extends between them. A control panel 134, best seen in FIG. 5, is mounted on the lower end portion of the frame 128. On the frame 128, above the cross member 133, a panel 140 is adjustably mounted by threaded bolts 141 extending through slots 141′ in the sides 130 and 132. The rotating arm 142 is mounted on a shaft 143 (FIG. 8) extending through the adjustable panel 140. An adjusting screw 144, similar to the screw 50 and carrying a knurled nut 145 is inserted in a threaded aperture provided in a lug 146 on fixed cross member 133, and bears against the underside of the panel 140 to move the latter vertically along the mounting frame 128, thereby adjusting the height of the center about which arm 142 rotates.

Figure 7:
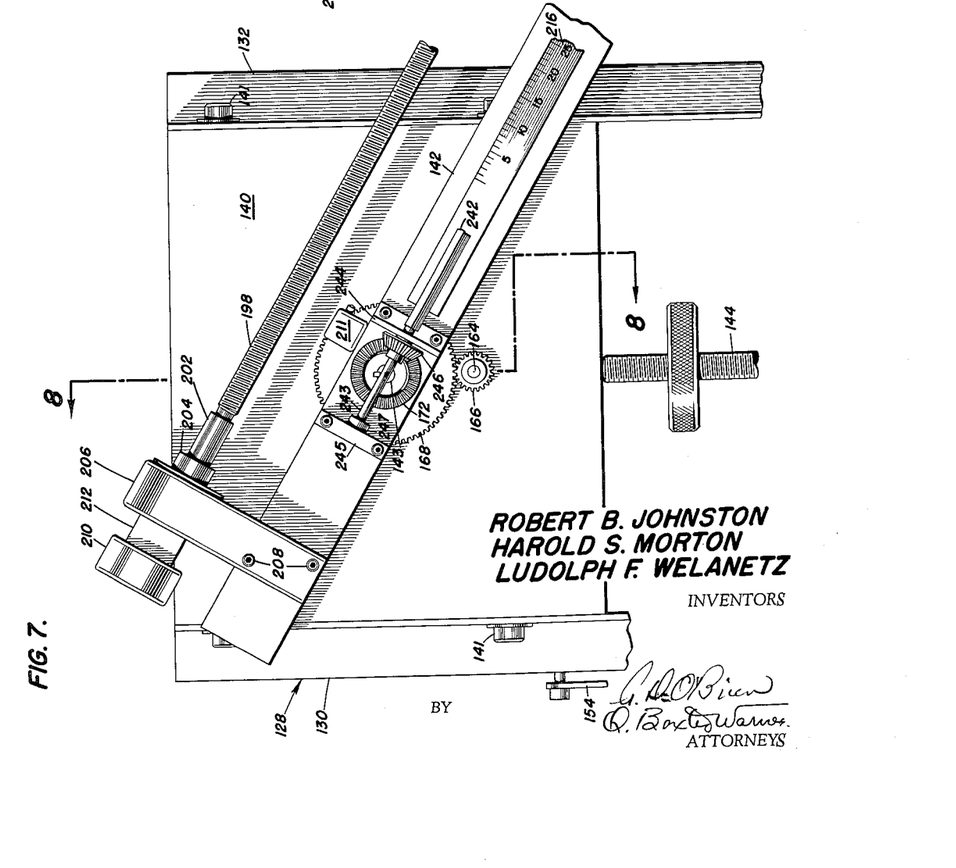
FIG. 7 is an enlarged partial elevation showing the details of the rotatable arm of the simulator.
Figure 8:
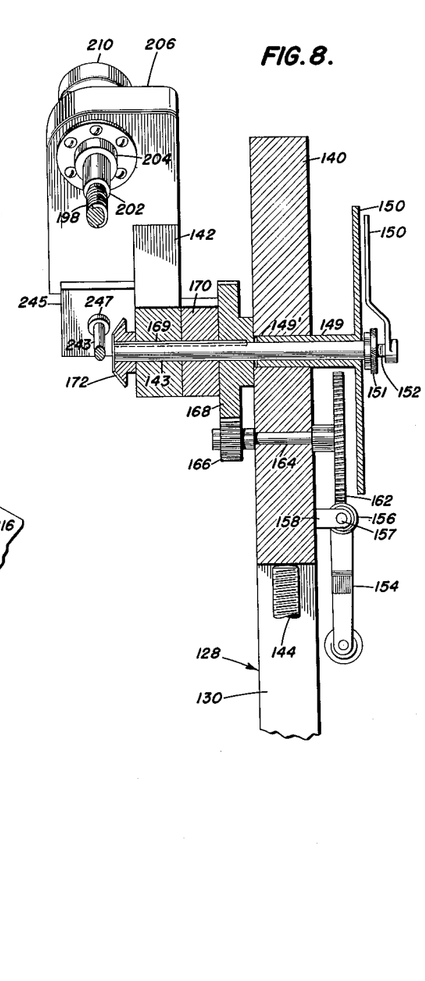
FIG. 8 is a section along line 8—8 of FIG. 7.

Referring to FIGS. 7 and 8, the shaft 143 which supports the rotatable arm 142 is rotatably received in a sleeve bearing 149 which extends through a suitable aperture 149′ provided in the adjustable panel 140. The bearing 149 has a dial 150, calibrated in degrees, formed integrally therewith at its outer end. A nut 151 is screwed onto a reduced threaded portion 152 of shaft 143 to prevent displacement of said shaft from the bearing 149, and a pointer 153 is mounted in the outer end of said shaft. The shaft 143 is rotated by a crank 154 and a gear train which includes a worm gear 156 carried on a shaft 157 mounted between brackets 158 and 160 on the panel 140. The worm gear 156 rotates a gear 162 which is carried on one end of a shaft 164 journaled in the panel 140 parallel to shaft 143. The other end of shaft 164 carries a pinion 166 which meshes with a gear 168 fixed on the shaft 143, by a key 169, for rotation therewith. A spacer 170 and the arm 142 are also fixed to move with the shaft 143, by said key 169, as is a bevel gear 172 carried on the inner end of said shaft. It can be seen that turning a crank 154 will cause the arm 142 to rotate. The pointer 153 and dial 150 will indicate the angular rotation of the arm 142.

Figure 11:
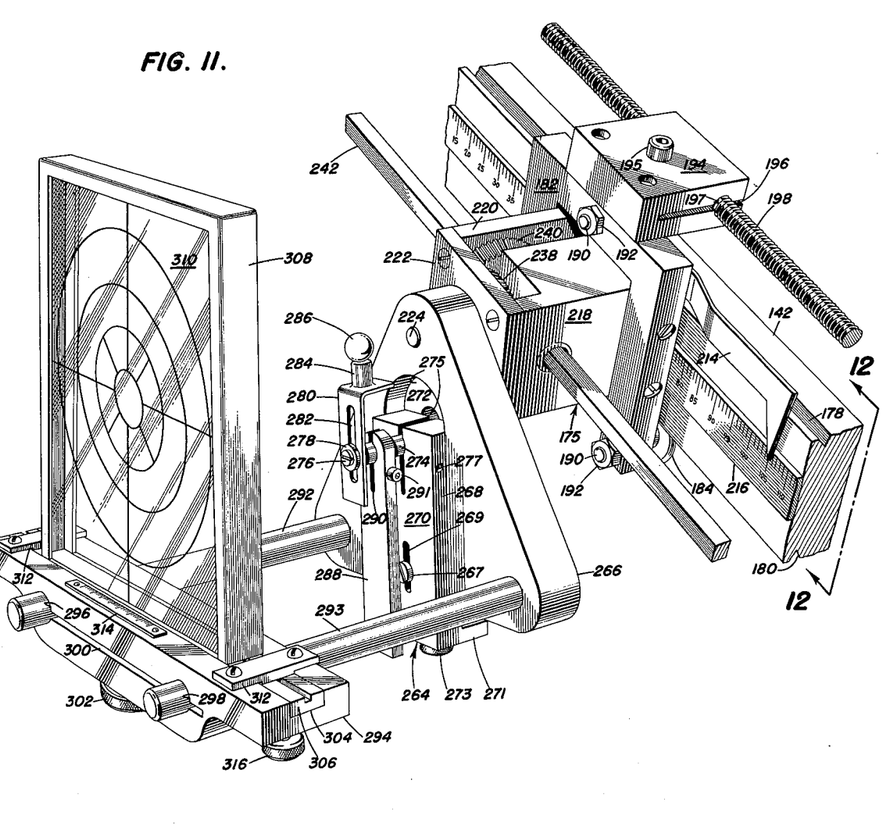
FIG. 11 is an enlarged perspective showing the details of the light source for simulating the warhead burst pattern.
Figure 12:
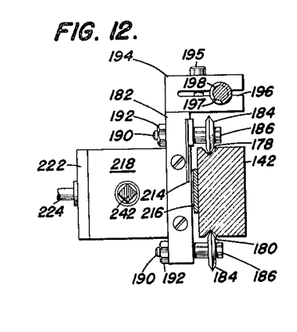
FIG. 12 is a section along line 12—12 of FIG. 11.

As best seen in FIGS. 4, 11, and 12, a carriage, indicated generally by reference numeral 175, is mounted for sliding motion along the arm 142. The arm 142 has V-shaped grooves 178 and 180 extending along its upper and lower surfaces, respectively. The carriage 175 comprises a plate 182 provided with a plurality of V-edge wheels 184 rotatably mounted on stub shafts 186 projecting from said plate. Each stub shaft 186 has a reduced threaded portion 190 extending through a suitable aperture in the plate 182, and a nut 192 holds each shaft in its respective aperture. The V-edge wheels 184 will roll in their respective grooves 178 and 180.

A clamping plate 194, having a slot 196 and mating threaded grooves 197 therein, is attached to the upper edge of plate 182, said grooves receiving a lead screw 198. The screw 198 has one end journaled in an end plate 200 carried on arm 142 at the outer end of said arm and its other end received in a bushing 202 journaled in bearing 204 adjacent the inner end of said arm. A clamping screw 195 is provided for locking the carriage in a desired set position on the lead screw 198. The bushing 202 is fixed to rotate with the shaft of a reversible electric motor 210 (FIGS. 4 and 7), mounted on the end plate 206 by a bracket 212. The motor 210 rotates lead screw 198 to move the carriage 175 back and forth along the arm 142. Limit switches 211 of the "micro-switch" type are provided in spaced relationship along the arm 142 and are adapted to be actuated by the carriage 175 to interrupt the motor circuit when the carriage reaches either end of the lead screw 198. A pointer 214 (FIG. 11) is carried on the plate 182 and cooperates with a scale 216 to indicate the position of the carriage on the arm 142.

As seen in FIG. 11, the carriage 175 also includes a gear housing comprising plates 218, 220, and 222, attached to the plate 182. A stub shaft 224 is journaled in the side plate 222 and means are provided for rotating said shaft to maintain an assembly for simulating the fuze cone, or more importantly, a light source used in the case of the simulation of the fragmentation pattern, horizontal as the arm 142 rotates. As shown in FIG. 11, the inner end of stub shaft 224 carries a bevel gear 238 which meshes with a second bevel gear 240 that is mounted on a rod 242, of rectangular cross section, extending through suitable apertures provided in the side plates 218 and 220. As best seen in FIGS. 4 and 7, one end of the rod 242 is received in an aperture 249 in the end plate 200 while the other end of said rod has a reduced round portion 243 journaled in the plates 244 and 245 which are suitably secured to the arm 142. A bevel gear 246 (FIG. 7) is mounted on the reduced portion 243 of rod 242 and meshes with the bevel gear 172 carried on shaft 143. The rod 242 is restrained from lateral motion by the gear 246 and a collar 247 which abut the plates 244 and 245, respectively. The sizes of the gears involved and their direction of rotation are such that the shaft 224 will rotate in the proper direction and at the proper speed to maintain the fuze cone assembly or the light source, described hereinafter, horizontal.

As can be seen in FIGS. 4 and 9, when the apparatus is set up for determining fuze triggering position the fuze cone assembly 176 is mounted on the carriage 175. The assembly 176 comprises a bifurcated bracket 226 having a tubular portion 228 for receiving the end of the shaft 224, and a telescoping rod 230 having a hub 231 which is pivotally mounted, by a pin 232, between the bifurcations of the bracket 226. A pointer 234 is also pivotally mounted on said pin and is connected to the rod 230 so as to move therewith. The fuze cone angle $\psi_F$ can be set with the aid of a protractor 236 which is arranged on the bracket 226 so that the pointer 234 will indicate the angle between the axis of shaft 224 and the rod 230.

The telescoping rod 230 is adjusted to represent a fuze cone radiation pattern. After the triggering position has been determined, in a manner to be described in detail hereinafter, and the distance R read from the scale 91, the telescoping rod 230 can be removed and an extensible tape measure 250 substituted therefor. As seen in FIG. 10, the tape measure 250 is provided with lugs 252 and is mounted on a pin 253 extending between spaced lugs 256 formed on a tubular member 258 which fits on shaft 224, replacing the tubular member 228. When mounted in this manner, the tape measure 250 provides a convenient means for determining the distance from the missile M to any desired point on the target 101.

Referring to FIG. 5, after the triggering position has been found, it is desired to know how many hits will be made on vulnerable parts of the target 101 so that probable missile lethality can be predetermined. For this purpose, regions of vulnerability are marked on a target 101' which is substituted for target 101 on the pedestal 98. It should be understood that the targets 101, 101' and supporting rods 106, 106', shown in FIGS. 4 and 5, are different in detail for the purposes of illustration only; that normally both the problem of determining triggering distance and missile lethality must be solved for each individual target and aspect. A screen 262 is arranged perpendicular to the fixed tracks 62 and 64, and a light source assembly 264, best seen in FIG. 11, is substituted for the fuze cone assembly 176. The screen 262 may be constituted by a flat wall surface or the like.

The light source assembly 264 includes a triangular plate 266 mounted on the shaft 224, replacing the fuze cone assembly 176. A recess 268 is provided in the plate 266, extending vertically from the base of said plate, to near the apex thereof, and a lamp holder 270, of rectangular shape, is fitted in said recess. The holder 270 is slotted at its upper end, at 272, and is provided with companion recesses to define jaws to receive a stub shaft 274 to be described in detail presently. The mounting means for the lamp holder 270 includes a screw 267 extending through a slot 269 in the lamp holder and an adjusting screw 273 which is passed through an arm 271 on the lower part of said lamp holder and threaded into the underside of plate 266. The stub shaft 274 is retained on the lamp holder 270 by a set screw 277. The outer end of the shaft 274 has a threaded aperture for receiving a screw 276 while the inner end of said rod extends into a recess 275 in the plate 266.

The screw 276, with a washer 278 thereon, adjustably secures a bracket 280 to the outer end of the stub shaft 274. The bracket 280 is formed with a slot 282 for receiving the screw 276, and carries a slot 284 for mounting a lamp 286. An adjusting lever 288, carried on the shaft 274 and provided with a slot 290 and a set screw 291, cooperates with the bracket 280 for permitting both vertical adjustment and tilting of the lamp 286, so that the lamp filament can be accurately located with respect to a pattern plate to be described hereinafter.

A pair of rods 292 and 293 extend from the plate 266, and a platform 294 provided with spaced apertures 296 and 298 is slidably mounted on said rods. The apertures 296 and 298 are interconnected by a slot 300 and a locking screw 302 is provided for clamping the platform 294 at the desired position along the rods. The platform 294 has a groove 304 in its upper surface which is adapted to receive the base 306 of a frame 308 for transparent pattern plate 310. The pattern is constituted by crosshairs and a plurality of concentric circles which are adapted to be projected onto the screen 262, together with the silhouette of the target 101', by illumination from the lamp 286. The frame 308 may be moved to the desired lateral position on platform 294 within the limits established by spaced bars 312 which are fastened to said platform by screws. A scale 314 is provided on the platform 294 to aid in adjusting the frame, and a locking screw 316 is provided for holding the frame at the adjusted position.

In the operation of the simulator it is necessary that the different parts be properly aligned. The fixed rails 60 and 62 must be perpendicular to the screen 262. The track 80 should be parallel to the fixed rails when $\beta$ is zero. The stand 120 must be adjusted so that the arm 142 is rotated in a plane parallel to the screen 262 and perpendicular to the rails 60 and 62, and its axis of rotation is in the same horizontal plane as the $\xi$-axis. The lamp 286 must be in the center of the bracket 280 and also directly above the center of rotation of the track 80 when the arm 142 is vertical. In addition, the scale 216 on the rotating arm 142 and the scale 91 on the track 80 must be calibrated. When the device is being used to determine the number of fragment hits, the pattern plate 310 must be arranged so that the line between the center of the rings on the plate and the center of the lamp 286 is horizontal and at the same time normal to said plate. With the plate 310 set in this manner the vertical line on the plate determines zero on the scale 314.

As indicated hereinabove, the aspect angles $\Lambda$ and $\Omega$, the fuze characteristics S and $\Psi_F$, the missile velocity $V_M$ and target velocity $V_T$, and the coordinates $\phi$ and $\rho$ locating the missile are given for a particular problem of determining triggering position. The angle $\beta$ at which track 80 is to be set is then determined from Formula 2 above. After the track 80 is set, the correct supporting rod 106 for the particular aspect of attack is chosen. The rod 106 is bent as shown in FIG. 6, the angle $\epsilon$ being calculated from Formula 4 above. The fuze cone assembly can then be set at the point designated by the coordinates $\phi$ and $\rho$. To do this it is first necessary to locate the X-axis, that is, the reference axis for $\phi$. As was pointed out above the X-axis makes an angle $\mu$ with the H-axis where $\mu$ is calculated from Formula 5 above.

The H-axis is horizontal and it can be set into the simulator as a reference by using a level and rotating the arm 142 to a horizontal position. The zero on dial 150 is then set accordingly. Then the arm 142 can be rotated through the angle $\mu$ and the dial 150 again set to zero. This locates the X-axis and then the arm 142 can then be rotated through the angle $\phi$. After the angle $\phi$ is set, the motor 210 is energized to move the carriage 175 the distance $\rho$ as indicated on the scale 215. The telescoping rod 230 is then set to the fuze cone angle $\Psi_F$ using the protractor 236, and the rod extended to a length equal to S.

It is then necessary to properly orient the target. This is done after the proper supporting rod 106 has been selected and placed in the chuck 100 with the target mounted on it. The target is then adjusted by means of a level so that the $\xi$-axis is horizontal. By definition, the $\xi$-axis makes the angle $\gamma$ with the $\rho$—$\phi$ plane. Thus the target is properly oriented if the rod 230 is set to angle 90°—$\gamma$ and the target is rotated until its axis is parallel to the rod. The angle $\gamma$ is calculated from Formula 1. When the target mount is locked in this position, the target is correctly oriented for a given aspect defined by the angles $\Lambda$ and $\Omega$.

The target carriage 90 is then moved along the track 80 until some part of the target 101 is intercepted by the fuze cone as represented by the rod 230. This is the triggering position. The distance R is measured and $Z_T$ is calculated from Formula 3.

After the triggering position is known, hits on the vulnerability target 260 can be determined by substituting the light source assembly 264 for the fuze cone assembly 176 (FIG. 4). To set the pattern plate 310 properly, it is necessary to know the fragment cone angle, the fragment pattern, and the delay time of the fuze. A pattern plate 310, having the correct fragment pattern, is set at the proper distance from the lamp 286 to give the correct fragment cone angle. To compensate for a delay time in the fuze, which may include the time elapsed between the instant the radiation "sees" the target and the instant of warhead burst, the target is moved closer to the lamp 286 by an amount determined by relative velocity between missile and target, and delay time. With the target in position, the pattern plate 310 can be adjusted to allow for motion of the target, which causes displacements of the fragment pattern relative to the target in planes normal and parallel to the Z-axis that may be computed from a knowledge of the velocity of the target and the relative velocity of target and fragment. The pattern plate may be moved these amounts to shift the fragment pattern. Warhead lethality is then determined from the shadow projected onto screen 262, which shows approximately the regions of the target that are in the fragment zone.

Obviously many modifications and variations of the present invention are possible in the light of the above teachings. It is therefore to be understood that within the scope of the appended claims the invention may be practiced otherwise than as specifically described.

What its claimed is:

1. Apparatus for use in the lethality studies of proximity fuzed projectiles, comprising means for representing a target plane in normal flight, means for representing a proximity fuzed projectile at a predetermined miss position with respect to said target plane, a movable carriage on which said first-mentioned means is mounted, and a track along which said carriage can be moved, said track being arranged to be positioned along a line parallel to a predetermined relative line of approach of a projectile and a target so that said carriage can be moved to locate said first and second-mentioned means at their actual relative positions at the time of detonation of said fuzed projectile.

2. Apparatus as claimed in claim 1, wherein the means for representing a proximity fuzed projectile includes means for simulating the cone of radiation of a proximity fuze.

3. Apparatus as claimed in claim 1, wherein the means for representing a proximity fuzed projectile includes means for simulating the fragmentation pattern of a projectile.

4. Apparatus for use in lethality studies of fuzed projectile, comprising means for representing a target plane in normal flight, a movable carriage on which said means for representing a target plane is mounted, a track along which said carriage may be moved, said track being arranged to be pivoted to a position parallel to a predetermined relative line of approach of a projectile and a target, and means for representing a proximity fuzed prejectile at a predetermined miss position with respect to said target plane, said last-named means including an arm mounted for rotation in a plane at right angles to the plane of pivotal motion of said track, and a carriage slidably mounted on said arm, said last-named carriage being arranged to be located at said miss position.

5. Apparatus as claimed in claim 4, wherein a telescopic rod simulating the cone angle and slant range of a proximity fuze is mounted on said last-named carriage.

6. Apparatus as recited in claim 4, wherein a light source is mounted on said carriage and a transparent plate provided with concentric circles simulating the fragment pattern of a warhead is also mounted thereon in spaced relationship to said light source.

7. Apparatus for use in lethality studies of fuzed projectiles comprising, means for representing a target plane in normal flight, a movable carriage on which said means for representing a target plane is mounted, a track along which said carriage is adapted to move, said track being arranged to be positioned parallel to a predetermined relative line of approach of a projectile and a target, means for representing a projectile at a predetermined miss position, and means for orienting said target plane in accordance with a predetermined aspect of attack of a missile on a target.

8. Apparatus for use in lethality studies of fuzed projectiles, comprising a scale model plane representing a target, a first movable carriage for supporting said model plane, a track along which said carriage can be moved, said track being mounted for pivotal motion in a plane parallel to the fuselage of said model plane, said track being adapted to be positioned parallel to a predetermined relative line of approach of a projectile and a target, a support arranged at a right angle to the plane of pivotal motion of said track, an arm rotatably mounted on said support and having its axis of rotation coincident with the trajectory of a projectile on a collision course with said target, a second movable carriage, said second carriage being slidably mounted on said arm, and means for simulating a fuzed projectile mounted on said second carriage, said last-named means being adapted to be located at a predetermined miss position with respect to said trajectory.

9. Apparatus for use in lethality studies of fuzed projectiles, comprising a scale model plane representing a target, a movable carriage for supporting said model plane, a target along which said carriage can be moved, said track being mounted for pivotal motion in a plane parallel to the fuselage of said model plane whereby said track can be positioned along a line parallel to the relative line of approach of a projectile and a target plane as determined by a prescribed aspect of attack of said projectile on said plane, a support arranged at a right angle to the plane of motion of said track, an arm rotatably mounted on said support and having its axis of rotation coincident with the trajectory of a projectile on a collision course with said target, a second carriage slidably mounted on said rotatable arm, means on said second carriage arranged to be located at a predetermined miss position with respect to said trajectory, and means for orienting said model in accordance with a predetermined aspect of attack.

10. Apparatus for use in lethality studies of fuzed projectiles, comprising a scale model plane representing a target, a movable carriage for supporting said model plane, a track along which said carriage can be moved, said track being mounted for pivotal motion in a plane parallel to the fuselage of said model plane whereby said track can be positioned along a line parallel to the relative line of approach of a projectile and a target plane as determined by a prescribed aspect of attack of said projectile on said plane, a support arranged at a right angle to the plane of motion of said track, an arm rotatably mounted on said support and having its axis of rotation coincident with the trajectory of a projectile on a collision course with said target, a second carriage slidably mounted on said rotatable arm, a telescopic rod pivotally mounted on said second carriage, said rod being adjustable to simulate the cone angle and slant range of a proximity fuze, and means for orienting said model in accordance with said predetermined aspect of attack.

11. Apparatus for use in lethality studies of fuzed projectiles, comprising a model representing the vulnerable parts of a target plane, a movable carriage for supporting said model, a track along which said carriage can be moved, said track being mounted for pivotal motion in a plane parallel to the fuselage of said model, whereby said track can be positioned along a line parallel to the relative line of approach of a projectile and a target plane as determined by a prescribed aspect of attack of said projectile on said plane, a support arranged at a right angle to the plane of motion of said track, an arm rotatably mounted on said support and havings its axis of rotation coincident with the trajectory of a projectile on a collision course with said target, means including a light source for simulating a fragment pattern slidably mounted on said rotatable arm and arranged to be located at a predetermined miss position with respect to said trajectory, and a screen parallel to said support and spaced therefrom, said model being interposed between the light source and the screen.

12. Apparatus for use in lethality studies of fuzed projectiles, comprising a platform, a track pivotally mounted on said platform, a carriage movably mounted on said track, a model representing the vulnerable parts of a target aircraft supported on said carriage, the fuselage of said model being parallel to the plane of pivotal motion of said track whereby said track can be arranged parallel to a predetermined relative line of approach of a projectile and a target, a screen extending at a right angle to the plane of motion of said pivotal track, a support extending at a right angle to the plane of motion of said pivotal track and spaced from said screen, said model being interposed between said support and said screen, an arm rotatably mounted on said support, the axis of rotation of said arm being coincident with the trajectory of a projectile on a collision course with a target, a carriage slidably mounted on said arm, a light source on said carriage and adapted to be located at a predetermined miss position with respect to said trajectory, and a glass plate having concentric circles thereon slidably mounted in spaced relationship to said light source, whereby a fragment pattern intercepting a target can be simulated.

13. The combination as claimed in claim 12, including means for maintaining said light source and said glass plate in a horizontal position as said arm is rotated.

References Cited in the file of this patent

UNITED STATES PATENTS 2,519,402   Ruiz et al. ___________ Aug. 22, 1950